April 21, 1936.  J. W. SMITH  2,038,089
DIAPHRAGM PUMP
Filed March 14, 1932  2 Sheets-Sheet 1
FIG. I
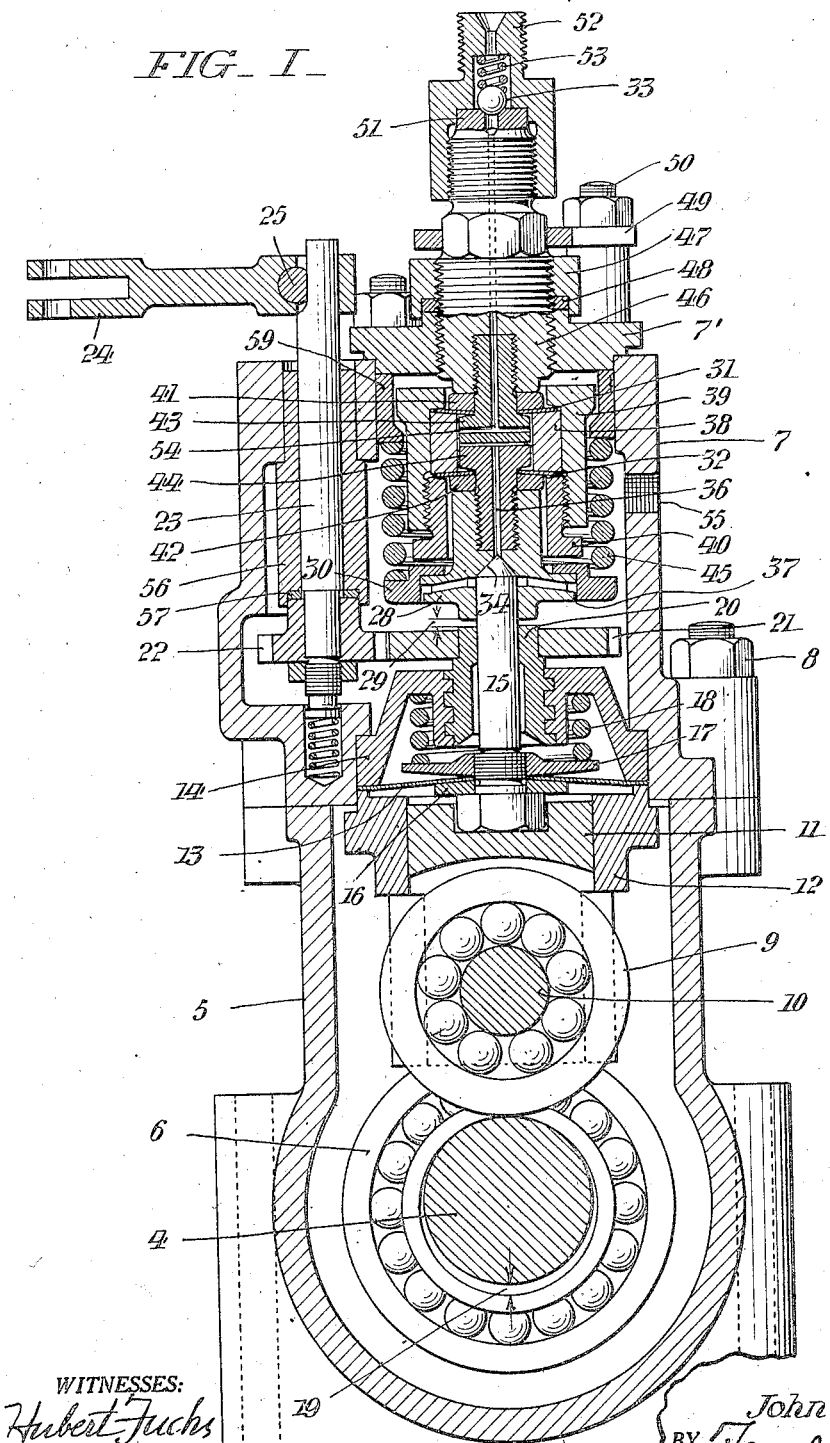
WITNESSES:
Hubert Fuchs
William Bell, Jr.
INVENTOR:
John W. Smith,
BY Fraley Paul
ATTORNEYS.

April 21, 1936. J. W. SMITH 2,038,089
DIAPHRAGM PUMP
Filed March 14, 1932 2 Sheets-Sheet 2
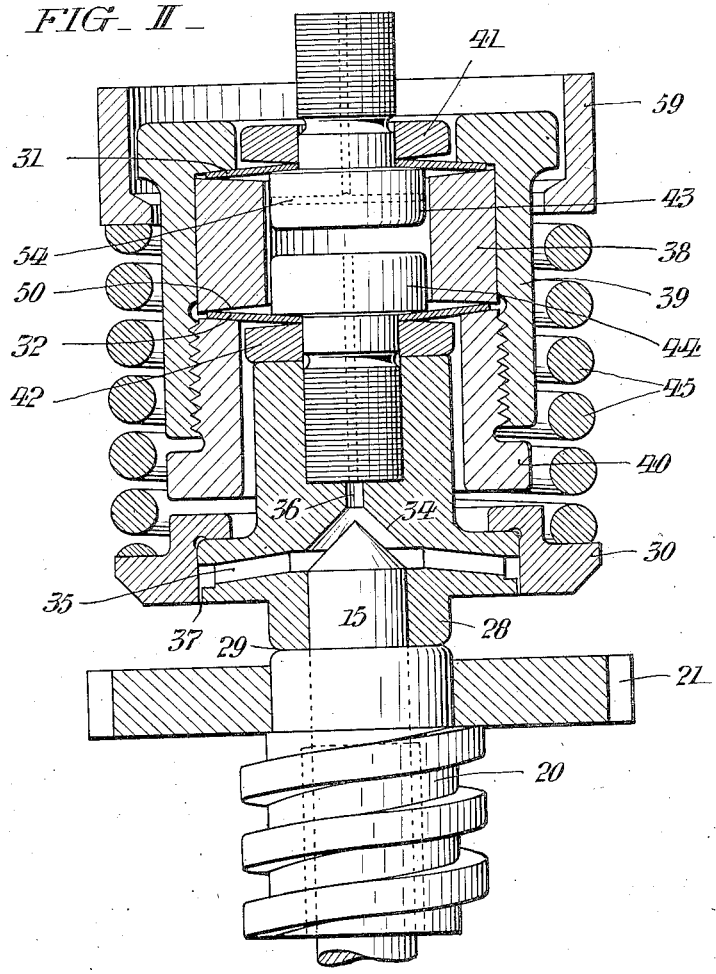
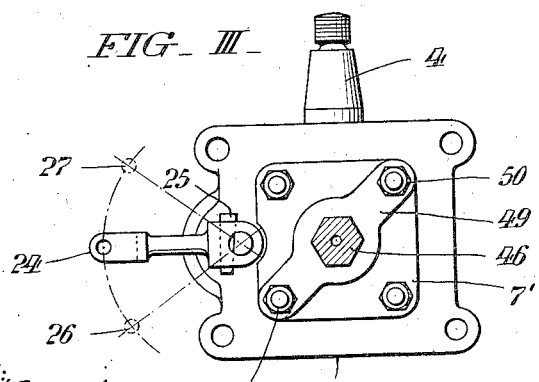
INVENTOR:
John W. Smith Patented Apr. 21, 1936

2,038,089

UNITED STATES PATENT OFFICE 2,038,089

DIAPHRAGM PUMP

John W. Smith, Philadelphia, Pa.

Application March 14, 1932, Serial No. 598,655

3 Claims. (Cl. 103—38)

This invention relates to high pressure metering of liquids and, more particularly, to the metering of liquid fuel for internal combustion engines.

The primary object of my invention is to provide a novel metering mechanism, herein shown as applied to a new form of diaphragm pumping element, which is suited for high pressure metering of liquids, such as water or gasoline, that lack sufficient lubricating properties to be metered by the precision fitted pistons of conventional pumps.

My novel diaphragm pumping unit has been operated at speeds above three thousand strokes per minute.

Precision metering is obtained by my invention at all speeds, due to the fact there is no leakage, while a novel diaphragm arrangement is made use of.

It is to be noted the diaphragm is preferably made of flat tempered spring steel which may be of the stainless variety. The amount of flexing imposed on the diaphragm is exceedingly small. A flat disc one and one-eighth inches in diameter would have a flexing movement of eight one-thousandths of an inch on either side of the neutral position. The combined pumping movement for two diaphragms would be .032" producing a diaphragm flexing of .008".

My improved metering mechanism has a novel mechanically-operated valve plunger which also actuates the pumping element.

For the purpose of illustrating my invention, I have shown by the accompanying drawings an embodiment thereof which will be found in practice to give satisfactory and reliable results. It is, however, to be understood that the various instrumentalities of which my invention consists may be otherwise arranged and organized, and that said invention is not limited to the precise form as herein shown and described.

In the drawings:

Fig. I is a central vertical section through a diaphragm pump embodying my invention.

Fig. II is a similar section of the diaphragm pumping unit, and associated parts, drawn to a larger scale; and, Fig. III is a top plan view of the upper portion of Fig. I, drawn to a reduced scale.

Referring more in detail to the drawings, the cam shaft 4 is mounted in a housing 5 on suitable anti-friction bearings 6, one only of which is shown. The pump casing 7 is bolted to the cam housing 5 by suitable bolts 8, one of which is shown in Fig. I. A roller 9 is journaled on a pin 10, which is securely mounted in a slide 11, reciprocative in the guide 12 that is securely clamped into the casing 7 by appropriate bolts, not shown. The diaphragm 13 and metering nut 14 are also clamped in place by the aforesaid bolts. The reciprocating valve member or plunger 15 has a threaded portion for clamping the diaphragm 13 thereto between special washers 16 and 17.

A spring 18 under compression is the means for causing the roller 9 to follow the eccentric portion of the cam shaft 4, as shown at 19. The diaphragm 13 flexes to either side of its neutral position and prevents the mingling of liquids in the pump casing 7 and housing 5. An adjuster screw stop 20 is threaded in the nut 14 around the valve member 15, while a gear 21 is securely fastened to set screw 20 and meshes with a pinion 22. A shaft 23 is secured to the pinion 22 and is rotatable by a lever 24 keyed to said shaft by means of a key 25. Fig. III shows the movement of the lever 24 to be from point 26 to point 27. When the lever 24 is at point 27, there would be no movement of pumping element 28, but the maximum movement of such pumping element is obtained when the lever occupies the position 26 shown in Fig. III.

In Fig. I, valve plunger 15 has raised the pumping element 28 a distance equal to the gap 29, which represents a normal pumping movement. It is obvious that the adjuster screw 20 may be turned to bear hard against the spring loaded valve seat part 30, thus eliminating the gap 29 and preventing any pumping movement. This condition would take place when the lever 24 is at point 27.

In Fig. I, diaphragms 31 and 32 are shown to be fully flexed inwards toward one another and all of the liquid has been expelled through spring loaded ball valve 33.

In Fig. II, diaphragms 31 and 32 are shown reversely flexed to the maximum point for taking in a full charge of liquid. To permit this, the lever 24 would be stationed at 26 in Fig. III. The corresponding downward movement of part 28 has closed the gap at point 29 between the parts 28 and 20, shown in Fig. I. A further downward movement of valve plunger 15 has withdrawn its conical end from valve seat 34, thus opening communication between the passage 35 and the orifice or passage 36. 37 is a restricted circumferential passage which may have an opening of less than .002", measured in a radial direction, which serves to strain entering liquid. This straining of the liquid is an important detail requisite to prevent grit and foreign particles from lodging on the valve seat 34 or entering the diaphragm cavity.

Diaphragms 31, 32 and annular ring 38 are clamped and secured in an internally shouldered and screw threaded sleeve housing 39 with considerable pressure on their outer edges or margins by means of a tubular nut or externally threaded sleeve 40 whose inner end forms an internal shoulder in the housing 39, opposite its own internal shoulder already mentioned. The faces of annular ring 38 and washers 41, 42 are machined to an appropriate angle or bevel to permit the requisite diaphragm deflection to each side of its neutral position.

In Fig. I it will be noted the diaphragms 31, 32 have been deflected hard against the annular ring or spacing sleeve 38 by washers 41, 42. The diameter of the washers 41, 42 is larger than the bore of the annular ring 38, so that they overlap the diaphragms 31, 32 outward substantially to the housing parts 39, 40. A comparatively large washer is very important in preventing the substantially flat flexible annular diaphragms 31, 32 from deflecting beyond a predetermined point during the pumping period when the liquid is under maximum pressure, which may be as high as 4000 pounds per square inch. Bolts having specially formed annular heads 43, 44, with their under sides machined to the required bevel or angle, limit the inward flexing of the diaphragms 31, 32 to the requisite amount. Diaphragms 31, 32 are clamped and secured with considerable pressure on their inner edges or margins between the heads of bolts 43, 44 and washers 41, 42. The bolts 43, 44 serve as supporting and operating connections, respectively, for the diaphragms 31, 32.

Referring to Fig. I, compression spring 45, which is arranged around housing members 39, 40 and acts on a shouldered ring of valve seat part 30 into which operating bolt 44 is screwed fast, so that the valve seat part 30 is really part of the diaphragm operating connection, has flexed diaphragms 31, 32 to the position where metering of the charge of liquid takes place. A plug 46 is threaded into the pump casing cover plate 7'. The packing unit 47 has a recess for inserting packing 48 for the purpose of preventing liquid from leaking past the threaded portion of the plug 46. 49 is a locking device for the plug 46 and is held in place by bolts 50.

Fig. I shows the cam shaft 4 to have moved valve plunger 15 to the end of its instroke or pumping movement. At this point the plug 46 is adjusted to establish maximum deflection of the diaphragms 31 and 32. The valve seat 51 for the ball valve 33 is clamped in place by a nut 52, while said ball valve is held to its seat by a tension spring 53. The nut 52 is suitably threaded for connection of a conventional pipe fitting, as ordinarily used with spray nozzles for internal combustion engines. The bolt 44 has the fuel orifice 36 extended as an axial passage through its center; while the bolt 43 has a passage 54 with right angle turns which is an important feature in expelling the air when the pump is first started.

An orifice 55 is threaded for a suitable pipe connection through which the liquid enters into the pump casing 7. A pressure of five pounds per square inch above atmosphere is required to force the liquid into the pump through the circumferential strainer passage 37. If the liquid is sluggish and the strokes per minute are high, considerably more pressure would be necessary. In Fig. I, 56 is a bushing for mounting the shaft 23, and it is provided with an anti-leak packing 57; while the shaft 23 is held in place by a spring 58. 59 is a sleeve against which the upper end of the compression spring 45 abuts, said sleeve being held in place in the pump casing 7 by the cover 7' thereof.

In operation, the rotation of the cam shaft 4 causes reciprocation of the slide 11 and of the valve member 15, the length of their stroke corresponding to the distance 19. At each upstroke, the valve member 15 strikes the valve seat 34 in the member 30 and lifts it off the stop screw 20 a distance corresponding to the vertical position of the screw: i. e., a maximum distance 29 equal to half the stroke 19 when the lever 24 is at 26 in Fig. III and the screw 20 at its position in Figs. I and II, and a distance of zero when the screw 20 is adjusted a distance 29 above its position in Fig. I, with the lever 24 at 27 in Fig. III. During the downstroke or outstroke of the valve member 15 and of the member or connection 30, a partial vacuum is created in the space between the separating diaphragms 31, 32; and when the connection 30 is arrested by the screw 20 and the still descending valve member 15 draws away from its seat 34, then liquid fuel is drawn in through strainer passage 37 and passages 35 and 36 into the space between the diaphragms 31, 32. When valve member 15 rises again and closes against its seat 34 on member 30, its further rise raises member 30, brings diaphragms 31, 32 closer together, and forces out a corresponding metered amount of liquid from between diaphragms 31, 32 past ball valve 33,—this amount being determined by the adjustment of the lever 24 and screw 20.

It will, of course, be readily understood that various changes may be effected in the details of construction within the scope of my invention as defined by the following claims.

Having thus described my invention, what I claim is:

1. A pump unit comprising a housing with a pumping bore therein; opposedly-flexible spaced diaphragms sealing said bore; relatively-reciprocative displacement means including rigid annulæ outwardly-overlapping the pumping bore and effective to prevent the diaphragms from being flexed by hydrostatic pressure; said sealing diaphragms being respectively secured between opposedly-inclined confronting faces to the relatively-reciprocative means near the center, and similarly at their outer peripheries in the housing aforesaid; one of the displacement means having an induction passage communicating with the pumping bore, and the other a valve-controlled eduction passage; means for straining liquid entering the induction passage; and means, including a valve controlling said induction passage, for reciprocating the first mentioned displacement means.

2. A pump unit comprising a housing with a pumping bore therein; opposedly-flexible spaced diaphragms sealing said bore; relatively-reciprocative displacement means including rigid annulæ outwardly-overlapping the pumping bore and effective to prevent the diaphragms from being flexed by hydrostatic pressure; said sealing diaphragms being respectively secured between opposedly-inclined confronting faces to the relatively-reciprocative means near the center, and similarly at their outer peripheries in the housing aforesaid; one of the displacement means having an induction passage communicating with the pumping bore, and the other a valve-controlled eduction passage; means for straining liquid entering the induction passage; a reciprocatory plunger for actuating the first mentioned displacement means and having a valve portion controlling the induction passage; and adjustable stop means coacting with the induction displacement means to vary its outward movement.

3. A pump unit comprising a housing with an annulus therein providing the pumping bore, said annulus having beveled ends confronting opposedly-inclined shoulders afforded by the housing; relatively-reciprocative displacement means in the form of headed members with coactive rigid washers, the heads of such washers being substantially conformative with, and the rigid washers extending outwardly beyond, the pumping bore; opposedly-flexible diaphragms adapted for sealing the pumping bore, said diaphragms being respectively secured near the center between the inclined face of a rigid washer and the opposedly-inclined underface of the associated headed displacement member, and similarly at their outer peripheries between the annulus beveled ends and the housing shoulders aforesaid; one of the displacement members having an induction passage communicating with the pumping bore, and the other a valve-controlled eduction passage; means for straining liquid entering the induction passage; a reciprocatory plunger for actuating the first mentioned displacement member and having a valve portion controlling the induction passage; and adjustable stop means coacting with the induction displacement member to vary its outward movement.

JOHN W. SMITH.